Patented May 26, 1942

2,283,977

UNITED STATES PATENT OFFICE 2,283,977

PRODUCTION OF ALIPHATIC ACIDS

Henry Dreyfus, London, and Walter Henry Groombridge, Spondon, near Derby, England, assignors to Celanese Corporation of America, a corporation of Delaware No Drawing. Original application March 22, 1939, Serial No. 263,420. Divided and this application December 7, 1940, Serial No. 369,112. In Great Britain April 1, 1938

11 Claims. (Cl. 260—541)

This invention relates to the production of fatty acids from their salts. This application is a divisional of our application Ser. No. 263,420 filed March 22, 1939.

According to the invention carbon dioxide and ammonia are brought into contact with a solution of a metal salt of a fatty acid, so as to form the ammonium salt of the fatty acid from which the free acid may readily be obtained. For example, this may be done by the methods described in U. S. Patents Nos. 2,090,941 and 2,090,947. Since the method of U. S. Patent No. 2,090,947 depends on the presence of metal salts of the fatty acids, it is of particular value when not all of the metal salt has been decomposed by the carbon dioxide.

The reaction between carbon dioxide, ammonia and sodium acetate, for example, results in the precipitation of sodium bicarbonate and the formation of ammonium acetate. The solution so obtained may be freed from sodium bicarbonate, for example by decantation, filtration or centrifuging, preferably in the cold, and may then be treated to recover acetic acid from the ammonium acetate. Unchanged sodium acetate may be returned to the process. Potassium acetate may be treated similarly.

The solvent for the metal salt of the fatty acid should be chosen with reference to the particular metal and fatty acid contained in the salt, as well as the corresponding ammonium salt, is more soluble in the solvent than is the bicarbonate of the metal.

Aqueous solutions of the acetates or other lower fatty acid salts of alkali metals may be used, as may also solutions in lower aliphatic alcohols, for example methyl, isopropyl, or especially ethyl alcohol. Preferably a relatively concentrated alcohol is used. For example when using ethyl alcohol it is preferable to employ a concentration of at least 85% and preferably higher, e. g. 90–98%, especially about 94%. By employing high concentrations full advantage can be taken of the insolubility of the bicarbonates in alcohols.

The rate of reaction may be increased by employing the carbon dioxide in as high concentration as possible. Thus it is advisable always to have the solution saturated with the gas, and advantageously excess of the gas may be passed through the solution and recirculated.

The concentration of the carbon dioxide may also be increased to a valuable degree by working under a pressure higher, and preferably considerably higher, than atmospheric; preferably a pressure above 70 lbs./sq. inch is used., e. g. a pressure of 80, 100, 120 or 150 lbs./sq. inch. If desired still higher pressures, e. g. 200, 400 or 800 lbs./sq. inch may be used. The temperature employed may be atmospheric, but it is advisable to employ higher temperatures, for example 70°–130° C. One advantage of using such higher temperatures is that the bicarbonates are then precipitated in a form which is more readily removed by filtration.

The concentration of the metal acetate in the solution is preferably as high as is conveniently possible. When treating sodium acetate in solution in alcohol, it is preferred to employ substantially saturated solutions.

The process can be carried out as a batch process in one or more autoclaves, or it may be carried out continuously. For example, the solution saturated with ammonia may be passed downwards through a succession of substantially vertical towers or other vessels, up which a stream of carbon dioxide is passed, preferably under pressure as already indicated. If the solution is drawn off at a point near but not at the bottom of each tower a considerable part of the precipitated bicarbonate can be collected in the space between the draw-off and the bottom of the tower, this space thus forming a settling compartment for the precipitate. The settling compartment, which may with advantage be wider than the body of the tower, may be provided above and below with suitable valves or cocks, so that when a considerable amount of precipitate has collected this may be drawn off, together with the solution in the lower end of the tower. Such solution is preferably separated from the precipitate and returned to the process. The rest of the solution, after leaving the tower, is preferably first cooled, and may then be filtered or otherwise treated to remove any bicarbonate it may still contain. When two or more towers are used in series, more ammonia may be introduced between any or each pair of towers.

The metal bicarbonate produced can be used in any suitable way. Advantageously sodium or potassium bicarbonate may be heated to liberate carbon dioxide, preferably under the pressure employed in the process, and this carbon dioxide returned to the fatty acid salt solution. The carbonate remaining may if desired be converted into the corresponding hydroxide.

The invention is thus of particular interest in the saponification of cellulose acetate textile materials with caustic soda or potash, since it provides a simple and cheap cyclic process whereby substantially all the sodium or potassium base can be regenerated for re-use, and the acetic acid removed from the materials can be recovered. If desired sodium acetate may be converted into potassium acetate before the treatment, so as to make use of the greater solubility of potassium acetate in aqueous alcohol. For example, potassium chloride may be added to an alcoholic solution of sodium acetate, whereby sodium chloride is precipitated, leaving potassium acetate in the solution; the proportion of sodium precipitated as chloride may be increased by evaporting off alcohol, preferably until a saturated solution of potassium acetate remains.

The following examples illustrate without in any way limiting the invention.

*Example 1*

A saturated solution of sodium acetate in 94% ethyl alcohol in an autoclave is first saturated with ammonia under 200 lbs. per square inch pressure, and is then subjected to the action of carbon dioxide under a partial pressure of 215 lbs. per square inch at 100° C. After about 2 hours the pressure is released; the solution containing ammonium acetate is allowed to cool, and then separated by filtration from the precipitated sodium bicarbonate.

To recover free acetic acid this solution is heated in a still provided with a fractionating column. As the temperature rises considerable quantities of ammonia come over, and may be collected, and increasing quantities of alcohol also distil over. The heating is continued until the temperature in the still reaches 140° C.; the recovery of the acetic acid is then completed as described in the example of U. S. Patent No. 2,090,941.

*Example 2*

A saturated solution of potassium acetate in 94% ethyl alcohol is heated to 80° C., saturated with ammonia under 250 lbs. per square inch pressure, and caused to flow down a tower in countercurrent to a stream of carbon dioxide. The tower is provided with bubble plates or other devices of the kind commonly used in the Solvay soda process for promoting intimate contact between the solution and the gas, and is capable of withstanding a relatively high internal pressure; at its lower end it is provided with a settling compartment for the greater part of the precipitate, the solution being continuously withdrawn from a level just above the settling compartment. By means of pipes set in the wall thereof the tower is kept at a temperature of 80° C., to which temperature also the solution is preheated under pressure before entering the tower. Inside the tower a carbon dioxide pressure of 250 lbs. per square inch is maintained.

After leaving the tower the solution is allowed to cool and is then filtered to separate such bicarbonate as has not been retained in the settling compartment. The output side of the filter is at atmospheric or lower pressure, and the solution is forced through the filter by the carbon dioxide pressure in the tower. The filtrate is treated to recover ammonia and acetic acid therefrom.

Although the invention has been described with particular reference to the treatment of alkali metal acetates, it may be applied to the treatment of salts of homologues of acetic acid as well as of fatty acids in which one or more hydrogen atoms are replaced by other atoms or groups. Moreover, salts of metals other than alkali metals may be treated. When treating calcium salts, for example, at temperatures of the order of 100° C., the bicarbonate first formed breaks down into the normal carbonate, setting free carbon dioxide for re-use. The calcium carbonate is readily separable from the solution by filtration.

Having described our invention, what we desire to secure by Letters Patent is:

1. Process for the manufacture of lower fatty acids from their salts with metals selected from the group consisting of alkali metals and alkaline earth metals which comprises bringing carbon dioxide and ammonia into contact with a solution of the salt so as to form the ammonium salt of the fatty acid and heating the solution of the ammonium salt so obtained to obtain the free acid therefrom.

2. Process for the manufacture of lower fatty acids from their salts with metals selected from the group consisting of alkali metals and alkaline earth metals, which comprises bringing carbon dioxide and ammonia under pressure into contact with a solution of the salt in an alcohol so as to form the ammonium salt of the fatty acid and heating the solution of the ammonium salt so obtained to obtain the free acid therefrom.

3. Process for the manufacture of acetic acid from alkali metal acetates, which comprises bringing carbon dioxide and ammonia under pressure into contact with a solution of the acetate in an alcohol so as to form the ammonium acetate and heating the ammonium acetate to liberate therefrom acetic acid.

4. Process for the manufacture of lower fatty acids from their salts with metals selected from the group consisting of alkali metals and alkaline earth metals which comprises saturating a solution of the salt with ammonia under pressure, then passing carbon dioxide under a partial pressure of above 70 lbs. per sq. inch to the solution so as to form the ammonium salt of the fatty acid and treating the solution of the ammonium salt so obtained to obtain the free acid therefrom.

5. Process for the manufacture of acetic acid from alkali metal acetates, which comprises saturating a solution of the acetate in an alcohol with ammonia under pressure, passing carbon dioxide under a partial pressure of above 70 lbs. per sq. inch into the solution so as to form ammonium acetate and heating the ammonium acetate to liberate therefrom acetic acid.

6. Process for the manufacture of lower fatty acids from their salts with metals selected from the group consisting of alkali metals and alkaline earth metals which comprises saturating a solution of the salt with ammonia under pressure, then passing carbon dioxide into the solution maintained at a temperature above 70° C. so as to form the ammonium salt of the fatty acid and heating the solution of the ammonium salt so obtained to obtain the free acid therefrom.

7. Process for the manufacture of acetic acid from alkali metal acetates, which comprises saturating a solution of the acetate in an alcohol with ammonia under pressure, passing carbon dioxide into the solution maintained at a temperature above 70° C. so as to form ammonium acetate and heating the ammonium acetate to liberate therefrom acetic acid.

8. Process for the manufacture of acetic acid from alkali metal acetates, which comprises saturating a solution of the acetate in an alcohol with ammonia under pressure, passing carbon dioxide under a partial pressure of above 70 lbs. per square inch into the solution maintained at a temperature between 70° and 130° C. so as to form ammonium acetate and heating the ammonium acetate to liberate therefrom acetic acid.

9. Process for the manufacture of acetic acid from alkali metal acetates, which comprises saturating a solution of the acetate in an alcohol with ammonia under pressure, passing carbon dioxide under a partial pressure of above 70 lbs. per square inch into a solution of the acetate in ethyl alcohol of a concentration between 90 and 98% and maintained at a temperature between 70° and 130° C. so as to form ammonium acetate and heating the ammonium acetate to liberate therefrom acetic acid.

10. Process for the manufacture of lower aliphatic acids from their salts with metals selected from the group consisting of alkali metals and alkaline earth metals which comprises bringing carbon dioxide and ammonia into contact with a solution of such a salt in ethyl alcohol of 90–98% concentration, so as to form the ammonium salt of the fatty acid, and heating the solution of the ammonium salt so obtained to obtain the free acid therefrom.

11. Process for the manufacture of acetic acid from the acetate of a metal selected from the group consisting of the alkali metals and the alkaline earth metals, which comprises bringing carbon dioxide and ammonia into contact with a solution of said salt in ethyl alcohol of 90–98% concentration, so as to form ammonium acetate, and heating the ammonium acetate so obtained to liberate the free acetic acid therefrom.

HENRY DREYFUS.
WALTER HENRY GROOMBRIDGE.